United States Patent [19]

Antonov

[11] Patent Number: 5,860,890
[45] Date of Patent: Jan. 19, 1999

[54] MULTI-DISC COUPLING DEVICE, AN AUTOMATIC TRANSMISSION EQUIPPED THEREWITH, AND A MANUFACTURING METHOD THEREFOR

[75] Inventor: Roumen Antonov, Paris, France

[73] Assignee: Antonov Automotive Technologies B.V., Rotterdam, Netherlands

[21] Appl. No.: 669,512

[22] PCT Filed: Jan. 18, 1996

[86] PCT No.: PCT/FR96/00083

§ 371 Date: Oct. 4, 1996

§ 102(e) Date: Oct. 4, 1996

[30] Foreign Application Priority Data

Jan. 23, 1995 [FR] France .................................. 95 00723

[51] Int. Cl.$^6$ .................................................. F16H 61/02
[52] U.S. Cl. .................. 475/257; 192/70.14; 192/107 M
[58] Field of Search .......................... 475/257; 192/70.14, 192/107 M, 48.3, 48.92

[56] References Cited

U.S. PATENT DOCUMENTS

| | | |
|---|---|---|
| 2,935,169 | 5/1960 | Mills . |
| 3,552,533 | 1/1971 | Nitz et al. ........................... 192/107 M |
| 3,695,406 | 10/1972 | Graham et al. ..................... 192/107 M |
| 3,895,693 | 7/1975 | Lucien et al. ..................... 192/70.14 X |
| 4,042,085 | 8/1977 | Bjerk et al. ........................ 192/70.14 X |
| 4,286,694 | 9/1981 | Wiseman, Jr. et al. .......... 192/70.14 X |
| 4,564,994 | 1/1986 | Marx . |
| 4,700,823 | 10/1987 | Winckler .............................. 192/107 M |
| 4,828,089 | 5/1989 | Collins et al. . |
| 4,846,326 | 7/1989 | Tilton et al. ........................ 192/107 M |
| 5,004,089 | 4/1991 | Hara et al. .......................... 192/107 M |
| 5,007,508 | 4/1991 | Lacombe ........................ 192/107 M X |
| 5,048,654 | 9/1991 | Yesnik . |
| 5,263,906 | 11/1993 | Antonov ................................. 475/257 |
| 5,484,347 | 1/1996 | Holmquist .............................. 475/231 |
| 5,514,044 | 5/1996 | Antonov ................................. 475/257 |

FOREIGN PATENT DOCUMENTS

| | | |
|---|---|---|
| 0 619 444 | 10/1994 | European Pat. Off. . |
| 2490756 | 3/1982 | France . |
| 2623862 | 6/1989 | France . |
| 91 14878 | 10/1991 | WIPO . |
| 92/07206 | 4/1992 | WIPO . |

Primary Examiner—Rodney H. Bonck
Assistant Examiner—Peter T. Kwon
Attorney, Agent, or Firm—Kenyon & Kenyon

[57] ABSTRACT

The coupling device, such as a clutch, comprises an alternation of first discs (22) made from hardened steel and having teeth (25) for rotational coupling with a first member of the clutch, and second discs (19) having teeth (15) for rotational coupling with a second member of the clutch.

The discs (19) are made of carbon fibres embedded in a carbon former, with no support inside the disc.

Use for improving the stability and progressive nature of the functioning of the clutch, and the longevity of the discs.

12 Claims, 2 Drawing Sheets

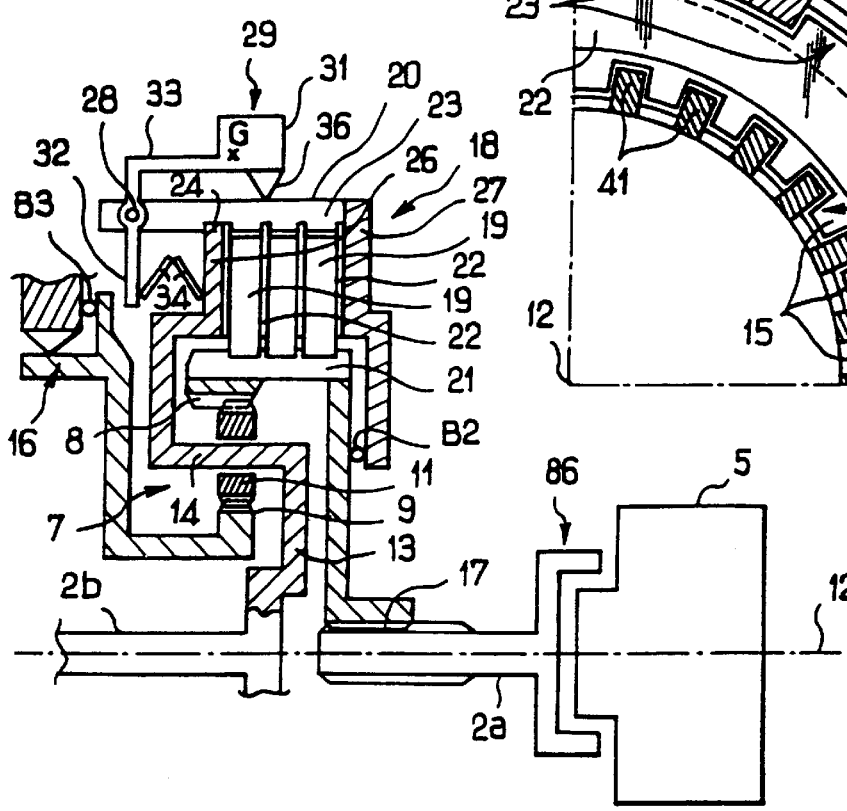
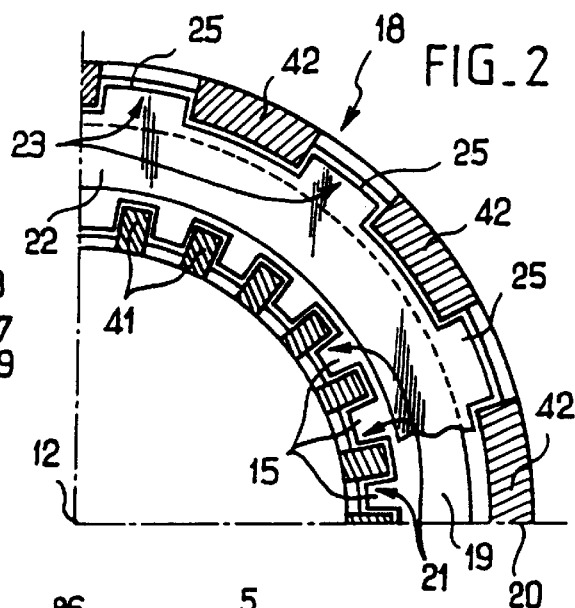
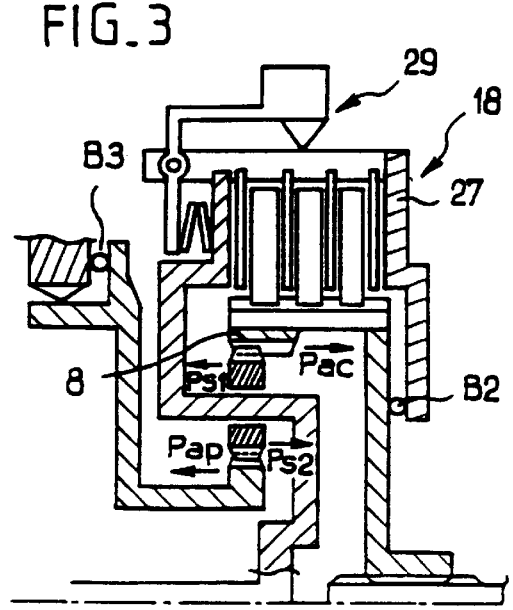
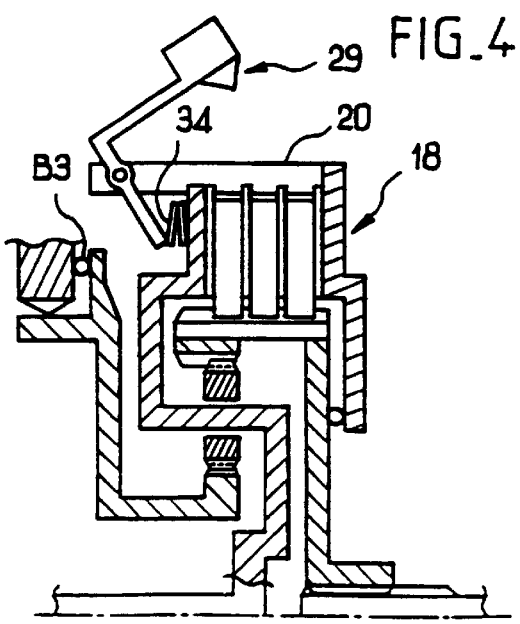

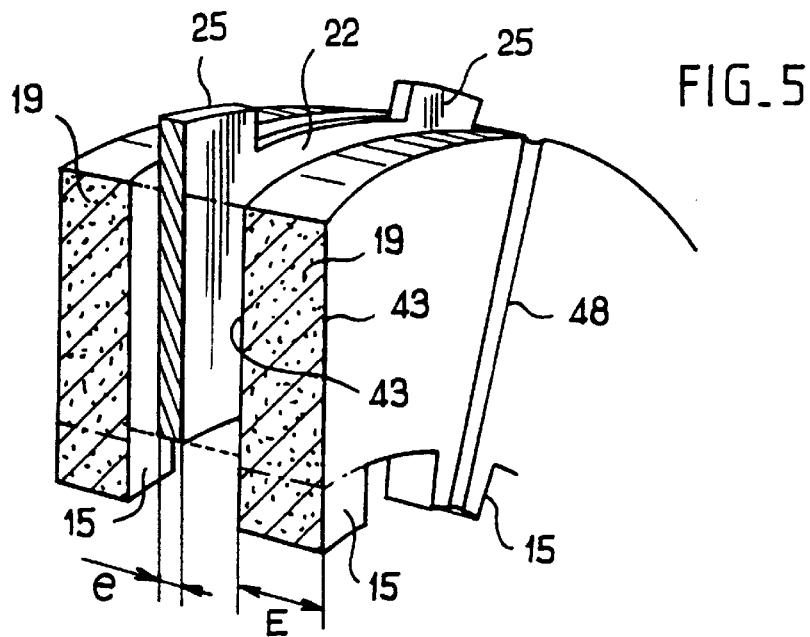
FIG_5
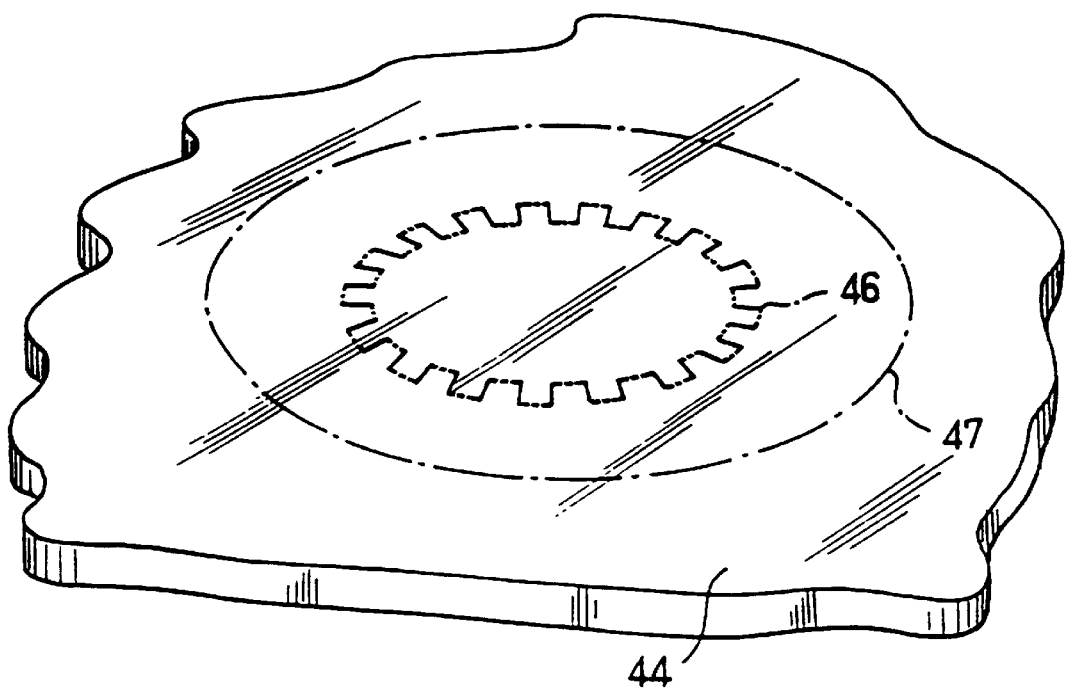
FIG_6

MULTI-DISC COUPLING DEVICE, AN AUTOMATIC TRANSMISSION EQUIPPED THEREWITH, AND A MANUFACTURING METHOD THEREFOR

DESCRIPTION

The present invention relates to a multi-disc friction coupling device, in particular a clutch or a brake, of the type which can be used for example in automatic transmissions for motor vehicles for the selective coupling of two rotary members of the transmission and thus to control the transmission ratio between the input and the output of the transmission.

The present invention also relates to an automatic transmission equipped therewith.

The present invention also relates to a method of making a disc of the multi-disc coupling device.

Automatic transmissions currently use, for controlling the transmission ratio which they provide, multi-disc clutches comprising an alternation of plates- or discs-connected to one and respectively to the other of two rotary members which must be selectively coupled and uncoupled. The coefficient of friction of the material used for the discs and the number of discs and their diameter have an effect on the axial engagement force which it will be necessary to apply to the clutch in order that the latter is capable of transmitting to one of the rotary members the torque received from the other. These clutches work in an oil bath whose function is cooling, the reduction of wear and the elimination of any residual friction even if the clearance between the discs is very small when the clutch is in the disengaged state. Normally, the discs are made of hardened steel and their thickness is chosen to be as low as is reasonably possible. In fact it is sought to reduce the axial dimension of the multi-disc clutch.

In practice, these clutches do not always have the qualities expected of them. In particular, the change from the coupled state to the uncoupled state is sometimes sudden. Furthermore, the clutch is subject to wear phenomena and consequently to a deterioration of its functional qualities over the course of time.

These defects assume a particular importance in the case of certain types of automatic transmission, such as described in WO-A-92 07 206, in which the friction characteristics between the discs are one of the elements which determine the points of change from one ratio to another in the transmission. The term "point of change" refers to each pair of values, speed of rotation/torque to be transmitted, for which the transmission automatically changes from one ratio to another. There are an infinite number of possible points of change because each value of torque to be transmitted corresponds to a speed of rotation at which the change of ratio in question will be made.

In the transmissions according to WO-A-92 07 206, the change from a given transmission ratio to a lower transmission ratio is carried out when the clutch, submitted to a calibrated engagement force, is no longer capable of transmitting the torque and therefore begins to slip. If the coefficient of friction is uncertain, the point of change for such a change of ratio will itself be uncertain.

The change from a ratio to a higher ratio results from a different process according to which the calibrated engagement force progressively overcomes a contrary force generated by a gearing reaction. At the same time, the passage of an increasing proportion of the power through the clutch progressively causes this gearing reaction to disappear. This finally makes it possible for the engagement force to acquire total supremacy. This process necessitates high quality in the frictional relationship between the discs if it is desired to avoid jolts.

Such ratio change processes give rise, between the discs, to phases of friction under load which are longer than in the case of entirely conventional automatic transmissions where the clutches and the brakes are actuated by actuators which are themselves controlled by logic control circuits.

It has been shown according to the invention that the coefficient of friction between steel discs varied with temperature and that these variations were the source of most of the observed operational defects. For example, during a progressive engagement process of the clutch, the temperature of the discs rises as the friction increases. The coefficient of friction increases as a consequence. This tends to cause a too-fast locking of the clutch, whether it is controlled by an actuator or in accordance with WO-A-92 07 206.

In a transmission according to WO-A-92 07 206, the point of change to a lower ratio depends directly on the coefficient of friction between the discs. Consequently, the point of change is not the same when the transmission is functioning at a relatively low temperature or, on the contrary, at a relatively high temperature, or especially just after the heating up having resulted from a recent change of ratio in the opposite direction.

A friction coupling device using discs with metal supports is known from U.S. Pat. No. 4,828,089. At least one disc out of two carries heavily grooved carbon linings in order to allow an intense circulation of a cooling and lubricating liquid. In fact, the bond between the carbon and the metal support does not withstand high temperatures. Such a device is expensive to produce, complex to put into use and has poor performance.

The purpose of the present invention is to overcome the said disadvantages by proposing a multi-disc clutch which is less prone to wear and less sensitive to temperature variations.

According to the invention, the multi-disc friction coupling device, in particular for automatic transmission intended for motor vehicles, comprising first and second coaxially rotary members, a first group of discs made of metal, integral in rotation with the fist member and alternating with the discs of a second group, integral in rotation with the second member, and means for selectively axially compressing and respectively axially releasing the discs, is characterized in that the discs of the second group are essentially made from a carbon-based material.

It has been observed that the metal/carbon contact gave rise to a coefficient of friction which was substantially indifferent to the temperature of the discs. Furthermore, the friction under load of metal against carbon generates only insignificant wear, even if it is only slightly lubricated or not lubricated and if the temperature locally reaches very high values at certain stages of the operation.

According to a second aspect of the invention, the automatic transmission comprising at least one combination of teeth and at least one multi-disc friction coupling device automatically controlled between the engaged state and the disengaged state in order to cause the combination of teeth to function according to a first and respectively to a second transmission ratio is characterized in that the multi-disc coupling device is in accordance with the first aspect.

Preferably, the friction coupling device is a clutch, the combination of teeth is at least partially off-loaded when the clutch is engaged, and the transmission comprises means of transmitting to the clutch, in the sense of disengagement, a gearing reaction generated in the combination of teeth when it is under load, means for engaging the clutch under a calibrated force giving the clutch a corresponding torque transmission capability, and a means of the free wheel type to prevent the reverse rotation of a reaction member supporting one of the sets of teeth of the combination.

Preferably, the carbon of the discs of the second group is reinforced with fibres, in particular with carbon fibres, according to the technology known as "carbon—carbon".

In particular, in the zone contained between the two friction faces of the disc, the discs of the second group do not comprise any support, in particular no metal support. In this way, the discs are less expensive to manufacture, and their thickness can be reduced for example to 3 mm, the thickness of the steel discs preferably being about 1 mm.

According to a third aspect of the invention, the method of making a disc of the second group of a friction coupling device according to the invention is characterized in that the disc is cut out in one piece from a sheet of carbon-based material having a thickness substantially the same as the thickness desired for the disc of the second group.

The structure, having no internal support, of the carbon discs is very simple and very reliable. When cutting out from the sheet, it is simultaneously possible to form, by a corresponding cutting-out contour, a set of teeth along one of the two annular edges of the disc. This set of teeth is intended to engage in corresponding grooves in the rotary member coupled with the carbon discs in the clutch.

Other features and advantages of the invention will emerge from the following description, given with reference to non-limitative examples.

In the accompanying figures:

FIG. 1 is a partial, diagrammatic half-view in longitudinal cross-section of a transmission having at least two ratios according to the invention, in the rest state, equipped with a multi-disc clutch according to the invention;

FIG. 2 is a partial view of the multi-disc clutch of the transmission shown in FIG. 1, in cross-section;

FIGS. 3 and 4 are views similar to that of FIG. 1, but simplified and relating to operation as a reduction gear and in direct drive respectively;

FIG. 5 is a partial view in cross-section and in perspective of three discs of the clutch of the transmission shown in FIGS. 1 to 4; and FIG. 6 is a diagrammatic view in perspective showing the method of manufacture of a carbon disc.

The transmission shown in FIG. 1, intended in particular for a motor vehicle, comprises a transmission device having two ratios and having an input shaft 2a and an output shaft 2b aligned with the axis 12 of the transmission. The input shaft 2a is connected to the output shaft of an engine 5 of a motor vehicle with the interposition of an input clutch 86. The output shaft 2c is intended to drive, directly or indirectly, the input of a differential in order to drive the drive wheels of a vehicle. Between the output shaft 2b and the input of the differential there can, for example, be interposed another transmission device with two or more ratios and/or a manually controlled forward drive/reverse drive change-over mechanism.

The input 2a and output 2b shafts are immobilized with respect to the casing 4 (partially shown) of the transmission.

The transmission device comprises a differential gearing formed by an epicyclic train 7. The train 7 comprises a crown 8 with internal teeth and a planet wheel 9 with external teeth, both engaging with satellites 11 supported, at regular intervals, around the axis 12 of the transmission device, by a satellite carrier 13 connected rigidly to the output shaft 2b. The satellites 11 can rotate freely about eccentric journals 14 of the satellite carrier 13. The planet wheel 9 can rotate freely about the axis 12 of the transmission device with respect to the output shaft 2b which it surrounds. However, a free-wheel device 16 prevents the planet wheel 9 from rotating in the reverse direction, that is to say in the direction opposite to the normal direction of rotation of the input shaft 2a with respect to the casing 4 of the transmission.

The crown 8 is connected in rotation, but free in axial sliding, with respect to the input shaft 2a, by the intermediary of splines 17.

A multi-disc clutch 18 is disposed around the crown 8. It comprises a stack of annular discs 19 alternating with annular discs 22. The discs 19 are connected in rotation to the crown 8 with the possibility of axial sliding. To achieve this, the discs 19 have internal teeth 15 (FIG. 2) engaged in grooves 21 which are integral with the crown 8. The discs 22 are connected in rotation, with the possibility of axial sliding, to the satellite carrier 13. To achieve this, a cage 20 comprises, on its radially internal face, grooves 33 into which are engaged in an axially sliding manner on the one hand external teeth 25 of the discs 22 and on the other hand external teeth 24 of the satellite carrier 13 (FIG. 1).

The grooves 21, 23 consist of open slots between thin discs 41, 42 which allow oil to enter and exit the annular space occupied by the discs 19, 22. If required, specific means can be provided to feed oil to the space located radially inside the grooves 21.

The stack of discs 19 and 22 can be axially clamped between a retaining plate 26 which is integral with the satellite carrier 13 and a mobile plate 27 which is part of the cage 20.

The cage 20 supports centrifugal fly-weights 29 disposed in a ring around the clutch 18.

The fly-weights are therefore connected in rotation to the output shaft 2b of the transmission device.

Each fly-weight has a solid body 31 located radially outside the discs 19 and 22 and an actuating tip 32 pressed against an external face of the fixed plate 26 by the intermediary of a Belleville spring 34. The tip 32 is connected to the solid body 31 by an elbow bend arm 33 articulated to the cage 20 about an axis 28 oriented tangentially with respect to the axis 12 of the device. WO-A-91/13275 describes advantageous arrangements for the articulated mounting of such fly-weights. The centre of gravity G of the fly-weight is located inside or in the vicinity of the solid body 31, and at a certain distance from the axis 28, said distance being measured parallel to the axis 12 of the device.

Thus, the rotation of the satellite carrier 13 tends to cause the bodies 31 of the fly-weights 29 to pivot radially towards the outside about their tangential axes 28 under the effect of their centrifugal force Fa, in order to make them move from a position of rest defined by a stop 32 against the cage 20 (FIGS. 1 and 3) to a separated position which can be seen in FIG. 4.

This then results in a relative axial displacement between the tip 32 and the articulation axis 28 of the fly-weight, and therefore between the tip 32 and the cage 20. With respect to the direction of displacement corresponding to the centrifugal separation of the fly-weights 29, the cage 20 is pressed axially against the crown 8, with relative rotational freedom, by an axial thrust bearing B2.

Thus, the displacement of the cage 20 with respect to the tip 32 causes a movement of relative coming together between the tip 32 and the mobile plate 27 of the clutch 18. This relative displacement can correspond to a compression of the Belleville spring 34 and/or to a displacement of the mobile plate 27 towards the fixed plate 26 in the direction of engaging the clutch 18.

When the transmission device is in the rest state as shown in FIG. 1, the Belleville spring 34 transmits to the cage 20, by the intermediary of the fly-weights 29 against their stop in the rest state, a force which engages the clutch 18 such that the input 2a of the transmission device is coupled in rotation with the output 2b and the transmission device constitutes a direct drive capable of transmitting a torque up to a certain maximum defined by the compression of the Belleville spring.

Furthermore, the teeth of the crown 8, the satellites 11 and the planet wheel 9 are of the helical type. Thus, in each pair of teeth engaging under load, opposing axial thrusts appear which are proportional to the circumferential force transmitted, and therefore to the torque on the input shaft 2a and to the torque on the output shaft 2b. The direction of helical inclination of the teeth is chosen such that the axial thrust Pac (FIG. 2) arising in the crown 8 when it is transmitting a driving torque is applied in the direction in which the crown 8 pushes the mobile plate 27, by the intermediary of the thrust bearing B2. Thus, when the axial thrust Pac exists, the crown 8 pushes the plate 27 in the direction separating it from the retaining plate 26 of the clutch 18. The satellites 11, which mesh not only with the crown 8 but also with the planet wheel 9, are subjected to two opposing axial reactions PS1 and PS2, which balance out, and the planet wheel 9 is subjected to, taking account of its meshing with the satellites 11, an axial thrust Pap which is equal in intensity and opposite to the axial thrust Pac of the crown 8. The thrust Pap of the planet wheel 9 is transmitted to the casing 4 by the intermediary of a thrust bearing B3. Thus, the axial thrust Pac is applied to the mobile plate 27 of the clutch and with respect to the casing 4, and therefore with respect to the retaining plate 26 of the clutch, and this occurs in the direction tending to disengage the clutch 18. This force, transmitted by the thrust bearing B2 to the cage 20, also tends to bring towards one another the tip 32 of the fly-weights 29 and the retaining plate 26, and therefore to keep the fly-weights 29 in their position of rest and to compress the Belleville spring 34.

This is the situation shown in FIG. 3. Assuming that this situation is reached, the basic functioning of the device will now be described. As long as the torque transmitted to the transmission device by the input shaft 2a is such that the axial thrust Pac in the crown 8 suffices to compress the Belleville spring 34 and to hold the fly-weights 29 in the position of rest shown in FIG. 3, the separation between the retaining plate 26 and the mobile plate 27 of the clutch is such that the discs 19 and 22 slip against one another without transmitting torque between them. In this case, the satellite carrier 13 can rotate at a speed different from that of the input shaft 2a, and it tends to be immobilized by the load which the output shaft 2b must drive. The result of this is that the satellites 11 tend to behave as motion reversers, that is to say to cause the planet wheel 9 to rotate in the direction opposite to the direction of rotation of the crown 8. But this is prevented by the free wheel 16. The planet wheel 9 is therefore immobilized by the free wheel 16 and the satellite carrier 13 rotates at a speed which is intermediate between the zero speed of the planet wheel 9 and the speed of the crown 8 and of the input shaft 2a. The unit therefore functions as a reduction gear. If the speed of rotation increases and the torque remains unchanged, a time arrives when the centrifugal force of the fly-weights 29 produces between the retaining plate 26 and the mobile plate 27 an engaging force with is greater than the axial thrust Pac, and the mobile plate 27 is pushed towards the plate 26 to achieve direct drive.

When the clutch 18 is engaged, all of the power is transmitted directly from the crown 8, connected to the input shaft 2a, to the satellite carrier 13, connected to the output shaft 2b. Consequently, the teeth of the epicyclic train 7 no longer work, that is to say that they no longer transmit any force and they do not give rise to any axial thrust. Thus, the axial thrust due to the centrifugal force can be applied fully to urge the plates 26 and 27 towards one another. The procedure for changing to direct drive is thus better understood: as soon as the discs 19 and 22 begin to rub against one another and transmit a proportion of the power, the teeth are proportionally off-loaded, the axial thrust Pac reduces proportionally and the supremacy of the centrifugal force increases more and more until the clutch 18 fully provides direct drive.

It can occur that the speed of rotation of the output shaft 2b reduces, and/or the torque to be transmitted increases, to the point at which the fly-weights 29 no longer provide, in the clutch 18, a sufficient engagement force to transmit the torque. In this case, the clutch 18 begins to slip. The speed of the planet wheel 9 reduces until it stops. The free wheel 16 immobilizes the planet wheel and the gearing force Pac reappears in order to disengage the clutch, such that the transmission device then functions as a reduction gear. Thus, each time that a change between operation as a reduction gear and operations in direct drive occurs, the axial force Pac varies in the sense which stabilizes the newly established transmission ratio. This is very advantageous on the one hand in order to avoid the incessant changes of ratio in the vicinity of certain critical operating points, and on the other hand in order that situations in which the clutch 18 is slipping are only transient.

The function of the Belleville spring 34 is to form a safety brake by coupling the engine 5 to the vehicle wheels when both are at rest, and to modify advantageously the characteristic of the engaging force applied to the clutch as a function of the speed of the output shaft 2b, in comparison with an engaging force which would be produced purely by the centrifugal effect.

Certain features of the multi-disc clutch 18 according to the present invention will now be described.

FIGS. 1, 3 and 4 show the multi-disc clutch as comprising only seven discs in total, but in practice this number may be considerably higher and can for example be up to about fifteen or twenty discs.

The discs 22, which will hereafter be referred to as "first discs" are made of hardened steel, according to the conventional technology of oil-bath multi-disc clutches. Their thickness "e" (FIG. 5) is for example about 1 mm.

On the other hand, the discs 19 integral in rotation with the crown 8 are entirely made from a material constituted of a carbon former in which carbon fibres are embedded, according to the technology known as "carbon—carbon". In particular, these discs have no metallic or other reinforcing core. The carbon based material occupies all of the space between the opposite friction faces 43 of a disc (FIG. 5). The thickness "E" of the carbon discs 19, greater than that "e" of the steel discs 22, is for example 3 mm.

As shown in FIG. 6, it is possible to produce such a disc from a sheet 44 of the said carbon—carbon material, having a uniform thickness equal to that desired for the discs 19, that is to say 3 mm in the example mentioned above, and the disc is cut out along two coaxial contours 46 and 47, one of which corresponds to the radially internal contour and the other of which corresponds to the radially external contour of the disc 19 to be produced. The internal contour 46 directly defines the teeth 15 of the disc, which are thus produced in one piece with the body of the disc defining the two friction faces 43

In the example shown, there is a first disc 22 at each end of the stack of discs belonging to the multi-disc clutch 18, and the number of first discs 22 is therefore greater by one than the number of second discs 19. By choosing to make the discs whose quantity is lower out of carbon, the cost and axial dimension of the clutch are reduced.

In a conventional manner, the teeth 15 of the discs 19 whose teeth are radially internal are more numerous and have a distinctly closer pitch than the teeth 25 of discs whose teeth are external. In fact, for the transmission of the same torque, the peripheral force is greater along the radially inner edge, and this necessitates the provision of more teeth along a periphery which is nevertheless smaller than the external periphery. It is preferred, according to the invention, that the carbon discs should be those whose teeth are internal, as shown. As these discs are thicker, the area of contact between each tooth and the corresponding groove side is relatively large and the number of teeth can therefore be reduced. Furthermore, discs with internal teeth have smaller internal and external diameters. They therefore require less material and their manufacture using the method illustrated in FIG. 6 causes less waste of material inside the contour 46 and outside the contour 47.

As shown in FIG. 5, it is possible to form in each friction face 43 of each carbon disc 19 at least one radial groove 48 and preferably at least two diametrically opposed radial grooves. Each groove extends from the free edge of a tooth 15 of the disc to the peripheral edge of the disc opposite to the teeth 15. In service, these grooves form, with the adjacent face of the neighbouring steel disc 22, a duct in which oil flows radially towards the outside by centrifugal effect.

The edges of the grooves 48 are incapable of damaging the steel discs. If the grooves were made in the steel discs, this could result in these discs having to be provided thicker, and in the risk of the edges damaging the adjacent carbon disc. The purpose of the grooves 48 is to allow oil to flow from the region located radially inside the discs to the region located radially outside the discs even when the clutch is engaged. But these grooves are not essential. It is currently preferred that the friction surfaces of the discs should be entirely smooth and that a passage is provided elsewhere to allow oil to flow as has just been described even when the clutch is engaged. Even if grooves such as 48 are provided, the discs can be considered as substantially smooth if these grooves remain rather small in number and leave large smooth areas. It has in fact appeared that in such conditions the grooves 48 do not significantly lubricate the contact between the discs when the clutch is in the state of end of slipping or in the state of adhesion under the effect of an engaging force.

The invention is not of course limited to the example described and shown.

The invention is applicable to multi-disc clutches actuated by actuators which are themselves controlled by a logic circuit, whether this be hydraulic or electronic. In comparison with the described examples, the engaging force can be produced by means other than the centrifugal fly-weights. For example a spring producing a constant engaging force can be used. With regard to the method, it is possible to start with a sheet which is a little thicker than the discs if the friction faces are to be machined subsequently.

The invention is applicable to multi-disc brakes.

I claim:

1. An automatic transmission comprising:
   at least one combination of sets of teeth;
   at least one multi-disc friction clutch capable of an engaged state and a disengaged state in order to operate in a first and respectively in a second transmission ratio, the combination of sets of teeth being at least partially off-loaded when the clutch is in the engaged state, wherein said clutch comprises first and second coaxially rotatable members, a first group of discs made of metal, which are mounted for common rotation with the first member and alternating with discs of a second group, which are mounted for common rotation with the second member, and means for selectively axially compressing and respectively axially releasing the discs, wherein each disc of the second group comprises a single mass of a carbon-based material defining two opposed friction faces;
   means of transmitting to the clutch, in the sense of disengagement, a gearing reaction generated in said combination when meshing under load;
   means for engaging the clutch under a calibrated force giving the clutch a corresponding torque transmission capability, and
   a means of the free wheel type to prevent the reverse rotation of a reaction member supporting one of the sets of teeth of said combination.

2. A device according to claim 1, wherein the carbon-based material of the discs of the second group is reinforced with fibres.

3. A device according to claim 2, wherein the fibers are carbon fibres.

4. A device according to claim 1, wherein the discs of the first group are made of hardened steel.

5. A device according to claim 1, wherein the thickness of the discs of the second group is greater than that of the disc of the first group.

6. A device according to claim 5, wherein the discs of the first group have a thickness of about 1 mm and the discs of the second group have a thickness of about 3 mm.

7. A device according to claim 1, wherein the first group of discs comprises one disc more than the second group, and wherein two end discs of a stack of discs formed by said first and second group of discs both belong to the first group.

8. A device according to claim 1, wherein the second member comprises axial grooves and the discs of the second group comprise teeth slidingly engaged in the grooves, and wherein said teeth are also made of the carbon-based material of said single mass.

9. A device according to claim 8, wherein the teeth of the discs of the second group are oriented radially inwardly.

10. A device according to claim 1, wherein the discs of the second group comprise at least one radial groove in each friction face.

11. A device according to claim 10, wherein the discs of the second group are connected for common rotation with an input member and the discs of the first group are connected for common rotation with an output member.

12. A device according to claim 1, wherein said friction faces of the discs of the second group and friction faces of the discs of the first group are substantially smooth.

* * * * *